United States Patent Office 3,759,828
Patented Sept. 18, 1973

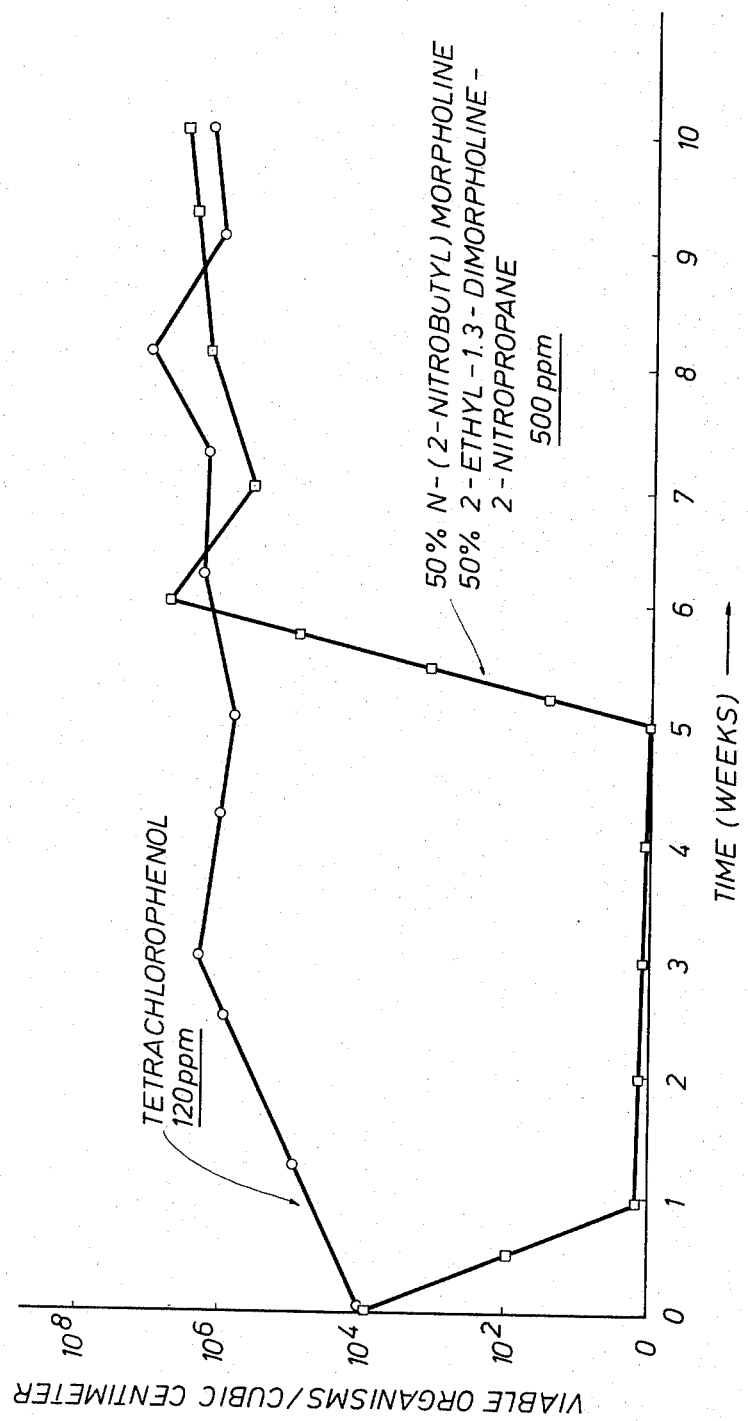

3,759,828
SOLUBLE OIL COMPOSITIONS
Henry R. Harrison, Port Arthur, Tex., assignor to
Texaco Inc., New York, N.Y.
Filed July 12, 1971, Ser. No. 161,681
Int. Cl. C10m 1/08, 1/32, 1/40
U.S. Cl. 252—33.4
9 Claims

ABSTRACT OF THE DISCLOSURE

Bactericide containing soluble oil compositions are disclosed as well as oil-in-water emulsions of said soluble oil compositions, wherein the emulsions exhibit bacteria inhibiting properties.

BACKGROUND OF THE INVENTION

Soluble oils generally are composed of mineral oil or mixtures of mineral and vegetable oils, and an emulsifying agent to lower the interfacial tension between the oil and water whereby emulsions of the oil-in-water type may be easily formed. The emulsifying agents commonly used include soaps of petroleum sulfonic acids, naphthenic acids, fatty acids, rosin and tall oil.

Soluble oils usually contain coupling agents and small amounts of water to stabilize the composition prior to emulsification with much larger quantities of water. Various lubricant additives are also used to correct or improve certain characteristics of the soluble oils or soluble oil emulsions.

Bacteria can be introduced into a soluble oil emulsion by a variety of means such as contamination by the workers, from the air during use, through the water used in the preparation of the soluble oil emulsion or from the piece of metal being shaped. The bacteria, if allowed to grow unchecked, will eventually cause breakdown of the emulsion and curtail the use for which it was intended.

In addition to the above occurrence, a serious odor problem is created by certain bacterial growth in the soluble oil emulsion used as a metal working fluid. It is believed that initially the growth of aerobic bacteria takes place with a resulting breakdown of the emulsion. During shutdown periods of the metal working machinery, as on weekends and holidays, certain anaerobic, sulfate-reducing bacteria quickly grow in the used emulsion due to the lack of aeration in the open system and to the conditions or material provided by the prior growth of said aerobic bacteria in the fluid. The presence of large amounts of sulfate-reducing bacteria causes severe odor problems due to the formation of sulfides and the odor is particularly noticeable on Monday mornings after weekend shutdown periods. The presence of anaerobic bacteria also causes a quicker and more severe emulsion breakdown than bacteria produced under aerobic conditions thereby necessitating draining and cleaning of the metal working fluid system and the addition of new metal working fluid.

In finding a satisfactory bacteria inhibitor for a soluble oil emulsion, a number of factors must be considered. These factors include toxicity, emulsion degradation, additive compatibility and destruction or growth inhibition of harmful bacteria for sufficient periods during the life of the soluble oil emulsion. Additionally, a factor of increasing importance is the pollution effect of the bactericides contained in the soluble oil emulsions. Generally, in industrial practice, used soluble oil emulsions are disposed of by breaking the emulsion, separating an oil phase from a water phase, disposing of the oil phase separately, and disposing of the water phase by routing it to sewage disposal, natural drainage, etc. When conventional bactericides such as phenolic or halogenated phenolic bactericides are employed in a soluble oil emulsion, at least a portion of such bactericides are distributed into the water phase when the used soluble oil emulsion is broken prior to disposal. By this means the bactericides find their way into the natural water supply. Many of the bactericides in common use, particularly the halogenated phenols such as tetrachlorophenol, either do not degrade or they degrade very slowly. Therefore, their concentration tends to increase in the natural water supply with time. The pollution caused by these non-degradable bactericides may take the form only of a bad taste in drinking water or may be more severe if the accumulation of the bactericides in the water supply is large.

SUMMARY OF THE INVENTION

In accordance with the present invention, a soluble oil composition which will form soluble oil emulsions having bactericidal properties and does not contain phenolic or halogenated phenolic compounds includes a bacteria inhibiting amount of a mixture of about equal parts of N-(2-nitrobutyl) morpholine and 2-ethyl-1,3-dimorpholine-2-nitropropane. The amount of this mixture which is useful in inhibiting bacterial growth in soluble oil emulsions ranges from about 100 to about 1,000 parts per million. The mixture may be compounded into soluble oil compositions in a range of from about 0.1 to about 3.0 weight percent in order to provide the desired bacteria inhibiting concentration in soluble oil emulsions prepared from the soluble oil compositions.

By employing the bacteria inhibiting mixture in the soluble oil compositions of the present invention, the polluting characteristics of the used soluble oil emulsions are substantially decreased as these compounds degrade in the natural environment and do not tend to increase in concentration.

DETAILED DESCRIPTION OF THE INVENTION

Soluble oil-in-water emulsions are formed with water to oil ratios ranging from about 5:1 to about 100:1. The more dilute emulsions, from 25:1 to 100:1 are preferred for cutting fluids which are used as lubricants and coolants in high speed metal shaping operations.

The soluble oil composition prior to emulsification mainly comprises a mineral lubricating oil and one or more emulsifying agents. The mineral oil is preferably a naphthene base distillate oil although mixed paraffin-naphthene base distillate oils are at times effectively employed. Naphthene base distillate fractions are desirable because of their better emulsification properties and stability. In general, refined base oil fractions having a SUS viscosity at 100° F. between 70 and 800 are used in the formulation of the soluble oils of this invention.

The emulsifying agents useful in the present invention are those known in the art and include ionic and non-ionic emulsifying agents. Examples of ionic emulsifying agents include oil soluble alkali metal petroleum sulfonates in the molecular weight range of from about 400–500, alkali metal naphthenates in the molecular weight range of from about 300–400, rosinates in the molecular weight range of about 300–400, salts of fatty and carboxylic acids such as guanidine salts of high molecular weight fatty acids and alkylolamine salts of carboxylic acids containing at least 10 carbon atoms, alkali metal salts of tall oil, etc. These soaps or salts are usually formed with sodium because of the lower cost and availability, but potassium is also used. Mixtures of emulsifiers, for example a mixture of sodium naphthenate, sodium petroleum sulfonate, and sodium rosinate have been found extremely useful. The total emulsifier concentration is between about 10 and about 20 percent by weight of the total soluble oil composition with concentrations between about 12 and about 16 percent usually employed. Examples of non-ionic emulsifying agents include ethoxylated alkyl phenols, ethoxylated alcohols, ethoxylated fatty acids and mixtures thereof. Mixtures of ionic and non-ionic emulsifying agents may also be employed in the soluble oil compositions of the present invention.

Minor amounts of coupling agents are also advantageously employed in the soluble oil composition to improve the stability thereof. The coupling agents useful in this invention include mono- and poly-hydroxy alcohols, and ether alcohols. Examples of these compounds include ethyl, isopropyl, n-propyl, iso-btuyl, n-amyl alcohol; ethylene glycol, diethylene glycol and propylene gloycol; ethylene glycol alkyl ethers wherein the alkyl group has from 1 to 8 carbon atoms, for example, ethylene glycol mono-ethyl ether, ethylene glycol mono-isopropyl ether, ethylene glycol mono-butyl ether, ethylene glycol mono-n-pentyl ether, ethylene glycol mono-n-hexyl ether, diethylene glycol mono-ethyl ether, and diethylene glycol mono-butyl ether. The concentration of the coupling agents in the soluble oil composition is usually between 0.1 and 1.5 percent by weight. A preferred coupling agent is ethylene glycol mono-butyl ether at a concentration of 0.6–1.0 percent by weight.

In preparing a stable soluble oil composition of this invention, a small amount of water is preferably used to prevent oil-emulsifier separation in the neat soluble oil or stratification of the emulsion upon mixing the soluble oil composition with much larger amounts of water. The water content necesary to stabilize the oil usually falls between 1 and 4 percent by weight. A water content of about 2 percent has been found to be particularly effective in these soluble oil compositions.

Other useful lubricant additives to improve certain characteristics of the soluble oil are at times used in the composiiton. These include, for example, rust preventatives such as alkylolamines and the like, and extreme pressure and oiliness agents.

The bactericide of the present invention is preferably incorporated into the soluble oil composition at the time of manufacture. However, the bactericide may be added to a soluble oil emulsion at the time it is prepared, or added to a soluble oil emulsion after a bacteria problem is evident, thereby correcting said problem before serious degradation of the soluble oil emulsion occurs. Preferably the bactericide is added to the soluble oil composition such that emulsions prepared from such soluble oil compositions have bacterial growth inhibiting properties.

In order to determine the value of compounds known or expected to have bacteria inhibiting properties in water solutions as bactericides for incorporation into soluble oil compositions, a series of screening tests were used.

Compounds which are primary skin sensitizers and compounds whose composition are unknown were eliminated from further consideration for use as bactericides in soluble oil compositions. The remaining compounds were tested for solubility in soluble oil compositions. Proportions of these bactericides were incorporated into soluble oil compositions such that the concentration of each bactericide in a 50:1 soluble oil emulsion would be an effective bacteria inhibiting concentration. Many of the tested bactericides were found to be insoluble in the soluble oil compositions. Additionally, many of the bactericides tested adversely affected the stability of the neat soluble oil compositions when left to stand for a one week period. Upon standing, the unstable soluble oil compositions separated into two liquid phases or solids precipitated therefrom. The stable soluble oil compositions containing bactericides were subjected to further testing.

The bactericide-containing soluble oil compositions which were found to be stable were then subjected to a preliminary emulsion stability test. In this test, 7.5 ml. of each soluble oil composition was well mixed with 2.5 ml. of a naphthene base mineral oil and the resulting oil blend was slowly added into 100 ml. of clarified tap water which was being stirred by mechanical mixer in a 250 ml. beaker to form an oil-in-water emulsion. A portion of each emulsion thus formed was poured into a 100 ml. test tube and allowed to stand at room temperature for two hours. At the end of the two hour period each emulsion was examined for creaming (i.e., emulsion stratification) and separation of oil. An emulsion sample showing more than a trace of cream or oil separation was considered to be too unstable for commercial application. Those bactericides containing soluble oil compositions which produced unstable emulsions under the conditions of this test, were not considered further.

The bactericide-containing soluble oil compositions which passed the preliminary emulsion stability test were then subjected to a satisfactory emulsion range test. In this test samples of each soluble oil composition were prepared containing sodium hydroxide in the range of 0 to 1 alkaline number and sufficient water such that stable 10:1 soluble oil emulsions could be prepared from the soluble oil compositions. The alkaline number is defined as the number of milliequivalents of hydrochloric acid required to neutralize one millilitre of the soluble oil composition. These soluble oil compositions containing sodium hydroxide and water were then tested for stability. Those soluble oil compositions which became cloudy or from which a water phase separated in the stability test were eliminated from further consideration.

The bactericide-containing soluble oil compositions which passed the satisfactory emulsion test were then tested for bacterial growth inhibiting properties. A "corn meal" test was first performed to screen out ineffective bactericides. In this test, 50:1 water to oil ratio emulsions of each bactericide-containing soluble oil composition to be tested were prepared employing "hard" or mineral containing water. One hundred grams of each emulsion thus prepared was added to one gram of corn meal and the mixtures were allowed to stand in the dark at room temperature for three weeks. At the end of each week the emulsion-corn meal mixtures were examined for evidences of fermentation and bacterial growth (i.e., bubbles, odor, discoloration, etc.). Those bactericide-containing soluble oil compositions which prevented fermentation or bacterial growth in the corn meal for three weeks were considered suitable for further testing.

The bactericide-containing soluble oil composition which passed the "corn meal" test were then subjected to a bactericide effectiveness test wherein bacterial growth-inhibiting properties were compared to such properties of a soluble oil composition employing a known, commercially acceptable bactericide. The bactericide selected for the standard in this test was tetrachlorophenol which is a known effective bactericide for use in soluble oil emulsions. In this bactericide effectiveness test, 500 ml. samples of 50:1 water to oil ratio soluble oil emulsions of each bactericide-containing soluble oil composition to be tested and of a soluble oil composition containing 0.6 weight percent tetrachlorophenol were prepared. Each emulsion sample was then inoculated with a known quantity of bacterial organisms (about 50,000 organisms per cc.) and then subjected to aeration at room temperature. The bacterial organisms were obtained from used soluble oil emulsions known to have bacterial problems. Bacteria counts were made on each emulsion sample weekly, including the standard, employing standard biological counting methods. By this test, the effectiveness in growth inhibition of aerobic bacteria of the test samples were compared to the effectiveness of the standard. Those bactericide-containing soluble oil compositions which were at least as effective in growth inhibition of aerobic bacteria as the standard were considered to have passed this test.

Although the bactericide effectiveness tests indicated the effectiveness of the bactericide-containing soluble oil compositions for growth inhibition of aerobic bacteria, the tests gave no indication of the effectiveness of such compositions for growth inhibition of anaerobic bacteria. Also, the laboratory controlled bactericide effectiveness test was not equatable to actual working conditions under which the bactericide-containing soluble oil compositions would be employed. Therefore, each soluble oil composition which passed the bactericide effectiveness test was submitted for use in commercial high speed cutting machines under actual working conditions. Emulsions of the bactericide containing soluble oil compositions were prepared and introduced into the reservoirs of high speed cutting machines. These machines were then operated in the normal manner to produce machined steel pieces on a normal schedule wherein they were operated during the week and were shut down weekends. In this manner, the effectiveness of the bactericide-containing soluble oil compositions for inhibiting the growth of sulfate reducing anaerobic bacteria under actual working conditions was determined. The use of each bactericide-containing soluble oil emulsion in the cutting machines was continued until the presence of appreciable numbers of sulfate reducing bacteria was made obvious by the foul odor of the soluble oil emulsion. Only those bactericide-containing soluble oil compositions which were as effective under actual working conditions as a soluble oil emulsion containing 0.6 weight percent tetrachlorophenol in the neat soluble oil were considered acceptable.

In Table I below, each bactericide tested and each test performed is listed. A mark (X) is shown for each bactericide beneath the test which that bactericide failed. The bactericides which passed all tests are indicated by a mark (X) in the right hand column.

TABLE I

| Bactericides | Primary skin sensitizers | Unknown contaminants | Insoluble in soluble oil composition | Unstable soluble oil | Unstable emulsion | Failed "Corn Meal" test | Failed Emulsion range test | Failed bactericide effectiveness test | Failed shop test | Passed all tests |
|---|---|---|---|---|---|---|---|---|---|---|
| Methylene bisthiocyanate | | | | | | | | X | | |
| Bis(n-dodecylguanidine) terephthalate | | | X | | | | | | | |
| 1-phenyl-2-nitropropane | | | | | | | | X | | |
| 50% N-(2-nitrobutyl) morpholine, 50% 2-ethyl-1,3-dimorpholine-2-nitropropane | | | | | | | | | | X |
| 2,3,5,6-tetrachloro-4-(methyl sulfonyl)-pyridine | | | X | | | | | | | |
| 1-(3-chloroallyl)-3,5,7-triaza-1-azoniaadamantane | | | X | | | | | | | |
| 6-acetoxy-2,4-dimethyl-m-dioxane | | | X | X | | | | | | |
| Organic ester | | X | | | | | | | | |
| Halogenated hydrocarbon | | | | | | | X | | | |
| Methylene bisthiocyanate | | | | | | | | X | | |
| n-Alkyl-dimethylbenzyl ammonium chloride | | | | | X | | | | | |
| Lauryl pyridinum-5-chloro-2-mercaptobenzathiazole | | | | | | | | | X | |
| Sodium dimethyl dithiocarbamate | | | X | | | | | | | |
| Disodium ethylene bis(dithiocarbamate) | | | X | | | | | | | |
| Hexahydro-1,3,5-tris (2-hydroxyethyl)-s-triazine | | | X | | | | | | | |
| Sodium-2-mercaptopyridine-N-oxide (powder) | | | X | | | | | | | |
| Sodium-2-mercaptopyridine-N-oxide (solution) | | | | | | | | X | | |
| Sodium-2-mercaptopyridine-N-oxide (crude reaction mixture) | | X | | | | | | | | |
| Laurylamine-2-mercaptopyridine-N-oxide | | | X | | | | | | | |
| Bis(trisbutyltin)oxide | X | | | | | | | | | |
| Trisbutyltin neodecanoate | X | | | | | | | | | |
| Trisbutyltin linoleate | X | | | | | | | | | |
| Alkyl dimethyl ethylbenzyl ammonium cyclohexyl sulfamate | | | | | | | | | X | |
| 2,2'-oxybis(4,4,6-trimethyl-1,3,2-dioxaborinane) / 2,2'-(1-methyltrimethylene dioxy) bis-(4-methyl-3,2,1-diborinane) | | | | X | | | | | | |
| Zinc dialkyldithiophosphate | | | | X | | | | | | |
| Chloroacetic acid | | | | X | | | | | | |
| Undecanoic acid | | | X | | | | | | | |
| Zinc undeconate | | | X | | | | | | | |
| 3,4,4'-trichlorocarbanilide | | | X | | | | | | | |
| Benzoic acid | | | | X | | | | | | |
| Complex triamine | | X | | | | | | | | |
| Dimethyl benzyl n-alkyl amide | | | | | | | | X | | |
| Cyclic amine | | | | | X | | | | | |
| Dimethyl benzyl n-alkyl amide | | | | | X | | | | | |
| Trimethyl-n-alkyl amide | | | | | X | | | | | |
| Trimethyl n-alkyl amide | | | | | | | | X | | |
| Alkyl Pyridine | | | | | | | | X | | |
| Hexadecylamine | | | X | | | | | | | |
| Ammonium sulfate salt of 2,2-dialkyl-2-4-hydroxymethyl-1,3-dioxolane | | | | | | | X | | | |
| Hexahydro-1,3,5-triethyl-s-triazine | | | | | | | | | | X |

I have discovered that a soluble oil composition containing from about 0.1 to about 3.0 weight percent of a mixture comprising about equal parts of N-(2-nitrobutyl) morpholine and 2-ethyl-1,3-dimorpholine-2-nitropropane passed all of the above tests and was found to be a commercially useful soluble oil composition. The soluble oil composition employed in the above tests comprised a naphthene base distillate oil, 5.0 weight percent sodium sulfonate, 3.5 weight percent sodium rosinate, 4.7 weight percent sodium naphthenate, 1.0 ethylene glycol monobutyl ether, 2.5 weight percent water and 2.5 percent of a mixture of about equal parts of N-(2-nitrobutyl) morpholine and 2-ethyl-1,3-dimorpholine-2-nitropropane.

I have found that soluble oil emulsions of from about 5:1 to 100:1 water to oil ratio prepared from such soluble oil compositions and containing from about 100 p.p.m. to about 1,000 p.p.m. of the mixture comprising about equal parts of N-(2-nitrobutyl) morpholine and 2-ethyl-1,3-dimorpholine-2-nitropropane exhibit good bacterial growth inhibiting properties under actual working conditions.

The water polluting characteristics of N-(2-nitrobutyl) morpholine and 2-ethyl-1,3-dimorpholine-2-nitropropane are less severe than the water polluting characteristics of many of the known bactericides employed in soluble oil compositions, particularly phenolic and halogenated phenolic bactericides. N-(2-nitrobutyl) morpholine and 2-ethyl-1,3-dimorpholine-2-nitropropane although effective as bactericides in the soluble oil emulsions, tend to degrade when diluted and placed in the natural environment. Therefore, the concentration of these compounds does not tend to increase in the natural water supply or in living tissue.

The usefulness of the mixture of about equal parts of N-(2-nitrobutyl) morpholine and 2-ethyl-1,3-dimorpholine-2-nitropropane in the preparation of soluble oil compositions which will impart bacterial growth inhibiting properties to soluble oil emulsions prepared therefrom is well demonstrated by the above table. An additional demonstration of the effectiveness of the bactericide mixture employed in the present invention is shown in the figure of the attached drawing. The figure of the drawing is a graphical representation of the results obtained in the bactericide effectiveness test as described hereinabove. The number of aerobic organisms per cubic centimeter present in an aerated sample of a 50:1 water to oil ratio soluble oil emulsion is shown over the course of several weeks. One line of the graphical representation shows the number of aerobic organisms present in a soluble oil emulsion containing about 120 p.p.m. of tetrachlorophenol. The other curve on the graphical representation shows the number of aerobic organisms present in such a soluble oil composition containing about 500 p.p.m. of a mixture of about equal parts of N-(2-nitrobutyl) morpholine and 2-ethyl-1,3-dimorpholine-2-nitropropane. From an examination of the graphical repersentation it can be seen that when the soluble oil emulsion containing the bactericide mixture of the present invention was employed, the bacterial growth inhibition characteristics was excellent for a period of about five weeks. At the end of the five week period the bacterial growth inhibition effectiveness of the mixture of the present invention decreased rapidly until it was only about as effective as the tetrachlorophenol. This graphical representation demonstrates not only the excellent bacterial growth inhibition of the mixture of the present invention, but also demonstrates the degradation of such mixture with time. Therefore by employing the bactericide mixture of the present invention, excellent bacterial growth inhibition in a soluble oil emulsion may be obtained and water pollution from dumping the water phase from used soluble oil emulsion into sewage treating facilities may be substantially avoided.

Obviously, many modifications and variations of the invention, as hereinbefore set forth, may be made without departing from the spirit and scope thereof. Therefore only such limitations should be imposed as are indicated in the appended claims.

I claim:

1. A soluble oil composition comprising a major proportion of an emulsifiable mineral lubricating oil, a minor proportion of an oil-in-water emulsifying agent, from about 1 to 4 weight percent water, and from about 0.1 to about 3.0 weight percent of about equal parts of N-(2-nitrobutyl) morpholine and 2-ethyl-1, 3-dimorpholine-2-nitropropane.

2. A soluble oil composition as in claim 1, including from about 10 to about 20 percent by weight of an oil-in-water emulsifying agent selected from the group consisting of oil soluble alkali metal petroleum sulfonates, alkali metal naphthenates and alkali metal rosinates.

3. A soluble oil composition comprising a major proportion of a naphthene base distillate lubricating oil, from about 10 to about 20 weight percent of an alkali metal salt of a compound selected from the group consisting of naphthenic acid, sulfonic acid, rosin, and mixtures thereof, from about 0.1 to about 1.5 weight percent of a coupling agent selected from the group consisting of monohydroxy alcohols, polyhydroxy alcohols, ether alcohols, and mixtures thereof, from about 1 to about 4 weight percent water, and from about 0.1 to about 3.0 weight percent of a mixture of about equal parts of N-(2-nitrobutyl) morpholine and 2-ethyl-1,3-dimorpholine-2-nitropane.

4. A soluble oil composition of claim 3 wherein the coupling agent is an ethylene glycol alkyl ether, wherein the alkyl group has from about 1 to 8 carbon atoms.

5. A soluble oil composition as described in claim 4 wherein the ethylene glycol-alkyl ether is ethylene glycol monobutyl ether.

6. A soluble oil emulsion comprising from about 5 to 100 parts of water to about 1 part of an emulsifiable lubricating oil, and a bacteria inhibiting amount in about the range of 100–1,000 parts per million of the said emulsion of a mixture of about equal parts of N-(2-nitrobutyl) morpholine and 2-ethyl-1,3-dimorpholine-2-nitropropane.

7. A soluble oil emulsion comprising from about 5 to 100 parts of water to about 1 part of a soluble oil composition comprising a major proportion of a mineral lubricating oil, from about 10 to about 20 percent by weight of an oil-in-water emulsifying agent selected from the group consisting of oil soluble alkali metal petroleum sulfonates, alkali metal naphthenates, alkali metal rosinates, and mixtures thereof; and a bacteria inhibiting amount in the range of from about 100 to about 1,000 parts per million of a mixture of about equal parts of N-(2-nitrobutyl) morpholine and 2-ethyl-1,3-dimorpholine-2-nitropropane.

8. A soluble oil emulsion comprising from about 5 to 100 parts of water to about one part of a soluble oil composition comprising a major proportion of a naphthene base distillate lubricating oil, from about 10 to about 20 weight percent of an alkali metal salt of a compound selected from the group consisting of naphthenic acid, sulfonic acid, rosin, and mixtures thereof, from about 0.1 to about 1.5 weight percent of a coupling agent selected from the group consisting of monohydroxy alcohols, polyhydroxy alcohols, ether alcohols, and mixtures thereof, from about 1 to about 4 weight percent water; and from about 100 to 1,000 parts per million of a mixture of about equal parts of N-(2-nitrobutyl) morpholine and 2-ethyl-1,3-dimorpholine-2-nitropropane.

9. A soluble oil emulsion comprising from about 5 to about 100 parts of water to about 1 part of a soluble oil composition comprising a major proportion of a naphthene base distillate lubricating oil, from about 10 to about 20 weight percent of an alkali metal salt of a compound selected from the group consisting of naphthenic acid, sulfonic acid, rosin, and mixtures thereof, from about 0.1 to about 1.5 weight percent of an ethylene glycol alkyl ether when the alkyl group has from about 1 to 8 carbon atoms, from about 1 to 4 weight percent water, and from about 0.1 to about 3.0 weight percent of a mixture of about equal parts of N-(2-nitrobutyl) morpholine and 2-ethyl-1,3-dimorpholine-2-nitropropane.

References Cited
UNITED STATES PATENTS

| | | | |
|---|---|---|---|
| 2,388,058 | 10/1945 | Herlocker et al. | 25—51.5 R |
| 3,183,188 | 5/1965 | Hodge | 252—51.5 R |
| 3,637,498 | 1/1972 | Sawyer | 252—49.5 |
| 3,183,189 | 5/1965 | Hodge | 252—51.5 R |

DANIEL E. WYMAN, Primary Examiner
W. J. SHINE, Assistant Examiner

U.S. Cl. X.R.
252—49.5, 51.5 R, 42.1; 260—246 B, 247

UNITED STATES PATENT OFFICE
CERTIFICATE OF CORRECTION

Patent No. 3,759,828                    Dated September 18, 1973

Inventor(s)  Henry R. Harrison

It is certified that error appears in the above-identified patent and that said Letters Patent are hereby corrected as shown below:

Column 3, line 25, the word "iso-btuyl" should read ---iso-butyl---.

Column 3, line 27, the word "gloycol" should read ---glycol---.

Column 3, line 49, the word "composiition" should read ---composition---.

Table 1, columns 5 and 6, the heading "Failed Emusion Range Test" should read ---Failed Emulsion Range Test---.

Table 1, columns 5 and 6, the X for 6-acetoxy-2,4-dimethyl-m-dioxane should be under the heading "Unstable Soluble Oil".

Table 1, columns 5 and 6, the X for Organic ester should be under the heading "Unstable Emulsion".

Table 1, columns 5 and 6, the X for Methylene bisthiocyanate should be under the heading "Failed Bactericide Effectiveness Test".

Table 1, columns 5 and 6, the X for n-Alkyl-dimethylbenzyl ammonium chloride should be under the heading "Unstable Emulsion".

Signed and sealed this 5th day of February 1974.

(SEAL)
Attest:

EDWARD M. FLETCHER, JR.            RENE D. TEGTMEYER
Attesting Officer                  Acting Commissioner of Patents